(12) United States Patent
Lynch

(10) Patent No.: US 6,438,859 B1
(45) Date of Patent: Aug. 27, 2002

(54) CALIBRATED ARCUATE WEDGE TOOL FOR MEASURING A GAP ADJACENT TO A CURVED SURFACE

(75) Inventor: Michael S. Lynch, Fostoria, OH (US)

(73) Assignee: Honeywell International Inc., Morristown, NJ (US)

( * ) Notice: Subject to any disclaimer, the term of this patent is extended or adjusted under 35 U.S.C. 154(b) by 28 days.

(21) Appl. No.: 09/766,791

(22) Filed: Jan. 22, 2001

(51) Int. Cl.⁷ .................. G01D 21/00; G01B 3/50
(52) U.S. Cl. .................. 33/613; 33/544.4; 33/600; 33/542
(58) Field of Search .................. 33/494, 501.02, 33/501.45, 514.1, 531, 542, 545, 546, 544.4, 551, 552, 553, 555.1, 555.3, 562, 571, 600, 613, 645, 679.1

(56) References Cited

U.S. PATENT DOCUMENTS

| | | | |
|---|---|---|---|
| 741,146 A | * 10/1903 | Labofish | 33/562 |
| 1,424,082 A | * 7/1922 | Clopton | 33/514.1 |
| 1,661,701 A | * 3/1928 | Michler | 294/99.2 |
| 2,846,772 A | 8/1958 | Strausser | 33/544 |
| 4,930,225 A | * 6/1990 | Phillips | 33/526 |
| 4,964,222 A | 10/1990 | Keener | 33/544.4 |
| 5,657,550 A | * 8/1997 | Struble | 33/544.4 |
| D411,808 S | 7/1999 | Irwin | D10/65 |

* cited by examiner

Primary Examiner—Diego Gutierrez
Assistant Examiner—Eric H Linn, Jr.

(57) ABSTRACT

A tool, for measuring a gap adjacent a curved surface of a workpiece, includes a curved tool body having a substantially C-shaped cross-section. The tool may further include a handle attached to the tool body. Preferably, the tool body has flattened top and bottom surfaces, which may be substantially parallel to one another. The tool body also includes curved front and back surfaces. The tool body has a relatively wide first end, and a second end which is narrower than the first end. The tool body tapers gradually and continuously from the first end to the second end, and becomes progressively narrower as it moves away from the first end. The tool body also gradually curves, as it moves from the first end to the second end, so that it is substantially C-shaped, as noted. The tool body has markings on at least one surface selected from the top, bottom, front and back surfaces, to indicate the thickness thereof at selected, regularly spaced apart intervals.

14 Claims, 3 Drawing Sheets

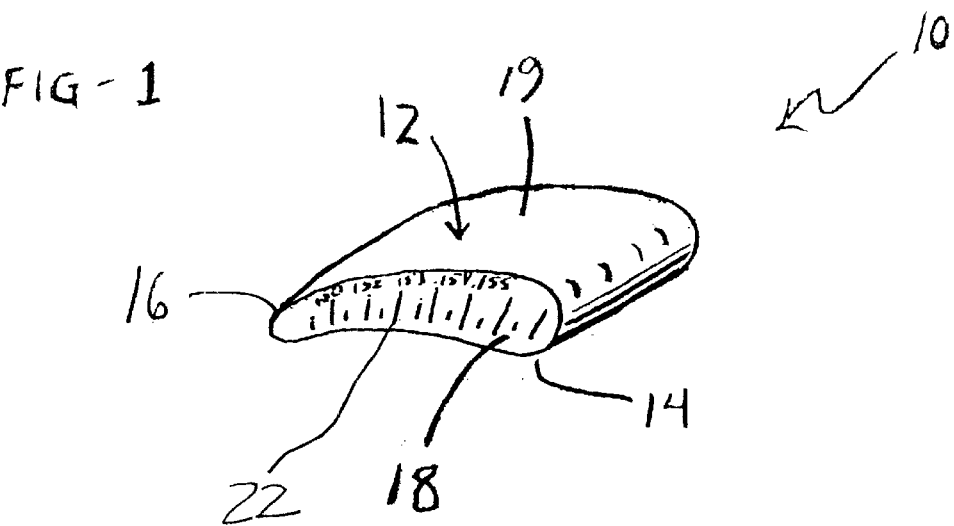
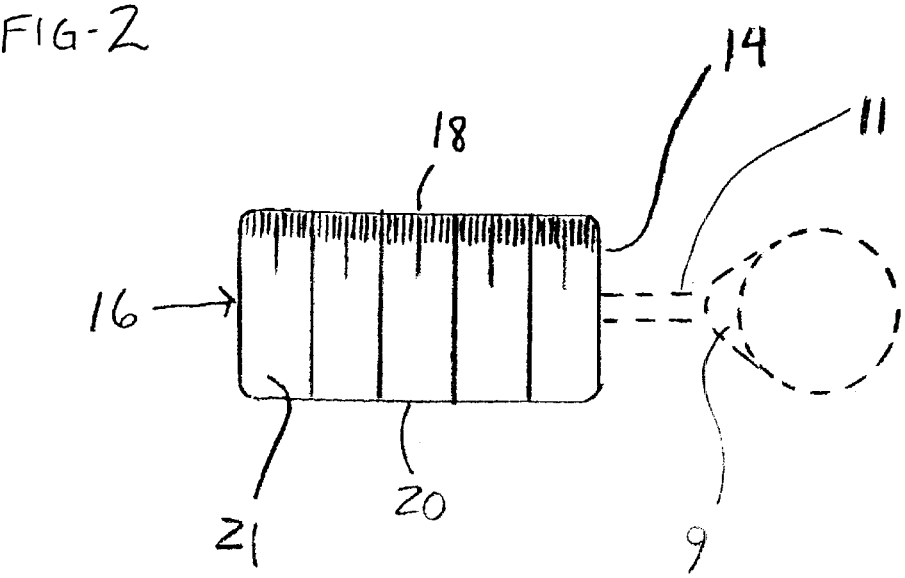

CALIBRATED ARCUATE WEDGE TOOL FOR MEASURING A GAP ADJACENT TO A CURVED SURFACE

BACKGROUND OF THE INVENTION

1. Field of the Invention

The present invention relates to a hand-operated tool for measuring a gap adjacent to a curved surface of a workpiece. More particularly, the present invention relates to a tool for measuring a gap between a first circular, semi-circular, or curved workpiece surface, and an opposing workpiece surface or object, which is spaced away from the first surface.

2. Description of the Background Art

Many different gauges are known for determining the size or extent of holes and/or spaces. Most of these devices relate to highly specialized fields where precise measurement is not only necessary, but is critical.

For example, feeler gauges and spark plug gap gauges are well known in the automotive field. Numerous gauges of this type are known and are commercially available.

In the jewelry industry, correct ring sizing is critical to ensure a comfortable yet secure fit. The apparatus of U.S. Pat. No. 4,964,222 provides a conically tapered tool for measuring the internal diameter of a ring, to ensure proper ring size.

In another field, a wedge-shaped measuring tool is known for measuring vertical or horizontal voids between two objects, between an object and a flat support surface such as a floor, or between different planes of the same object, as disclosed in U.S. Pat. No. 2,846,772, issued in 1958 to Strausser. The wedge-shaped tool of Strausser has flat surfaces on all sides thereof.

Another wedge-shaped measuring tool, which is similar to the Strausser tool, is disclosed in U.S. Design patent 411,808, issued in 1999 to Irwin. The device of the Irwin design patent tapers inwardly on two adjacent sides thereof as it approaches a tip portion, offering the user two possible measurements (length and width, depth and height, etc.) of a space between two objects, or between different planes of the same object. The wedge-shaped tool of Irwin also has flat surfaces on all sides thereof.

While the known devices provide some useful tools, and these tools are usable for their respective purposes, difficulty still occurs when attempting to accurately measure a gap between a curved workpiece surface and another workpiece feature or element, which is spaced a fixed distance away from that surface. Currently, measuring this distance is performed with cumbersome calipers and/or pin gauges, that may shift while the user attempts to adjust the tool to fit the spacing. As a result, accurate measurements, of spaces having the described curved geometry, are difficult and time-consuming to ascertain with the known measuring tools.

In particular, in the process of manufacturing spin-on cartridge type fluid filters, such as oil filters and the like, such filters include a base plate. Certain reinforcement bosses are formed on the filter base plate, for retaining and supportively reinforcing an annular seal anchored to the base plate. As a matter of quality control, during the manufacturing process, a distance or gap must be measured, between the tip of each reinforcement boss and an opposed inward-facing surface of a groove formed in the filter base plate. If this distance is not equal around the filter, within specified tolerances, the filter must be scrapped. Previous efforts to measure this boss to groove sidewall clearance gap have proven to be time-consuming and labor intensive.

As a result of the above-described difficulties, a need still exists in the art for a tool that will accurately measure a fixed distance, between a first, curved surface of a workpiece, and an opposing surface, feature, or element of the workpiece. In particular, a need exists for a tool of the described type, which is capable of measuring a variety of gaps, having dimensions falling within a specified range.

SUMMARY OF THE INVENTION

The present invention has been developed to overcome the foregoing limitations and disadvantages of conventional gap measuring tools and equipment, as used for measuring openings or gaps next to curved surfaces.

The present invention provides a tool for measuring a gap adjacent to a curved surface, including a tool body formed essentially as a curved wedge, and having a variable calibrated width along the length thereof, which decreases from a first width, at a first end thereof, to a second width thinner than the first width.

A tool according to the invention is made from a unitary piece of material in the shape of a curved wedge with calibrated ruler-like measurements etched into, or otherwise marked on the surface thereof. The curved wedge shape allows a user to easily measure multiple gap sizes with a single tool. The curved shape of the wedge allows it to fit slidably into the gap, for efficient and accurate measurement, rather than requiring a more cumbersome operation such as adjusting a caliper, or manipulating a pin gauge. In addition, the tool according to the present invention facilitates increased production speed and efficiency, by eliminating the previously required time-consuming process of re-calibrating measuring tools.

A tool, according to a first embodiment of the invention, includes a curved tool body having a substantially C-shaped cross-section. The tool body may be solid or hollow. The tool body has substantially flattened top and bottom surfaces, which may be substantially parallel to one another. The tool body has a relatively wide first end, and a second end which is narrower than the first end. The tool body tapers gradually and continuously from the first end to the second end, and becomes progressively narrower as it moves away from the first end. The tool body also gradually curves, as it moves from the first end to the second end, so that it is substantially C-shaped, as noted. The tool body has markings thereon, to indicate the thickness thereof, at selected, regularly spaced apart intervals.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 1 is a perspective view of a measuring tool in accordance with a first embodiment of the present invention, illustrating ruler-like measurements on an upper surface thereof;

FIG. 2 is a side plan view of the tool of FIG. 1;

DETAILED DESCRIPTION OF THE PREFERRED EMBODIMENT

Figure 3:
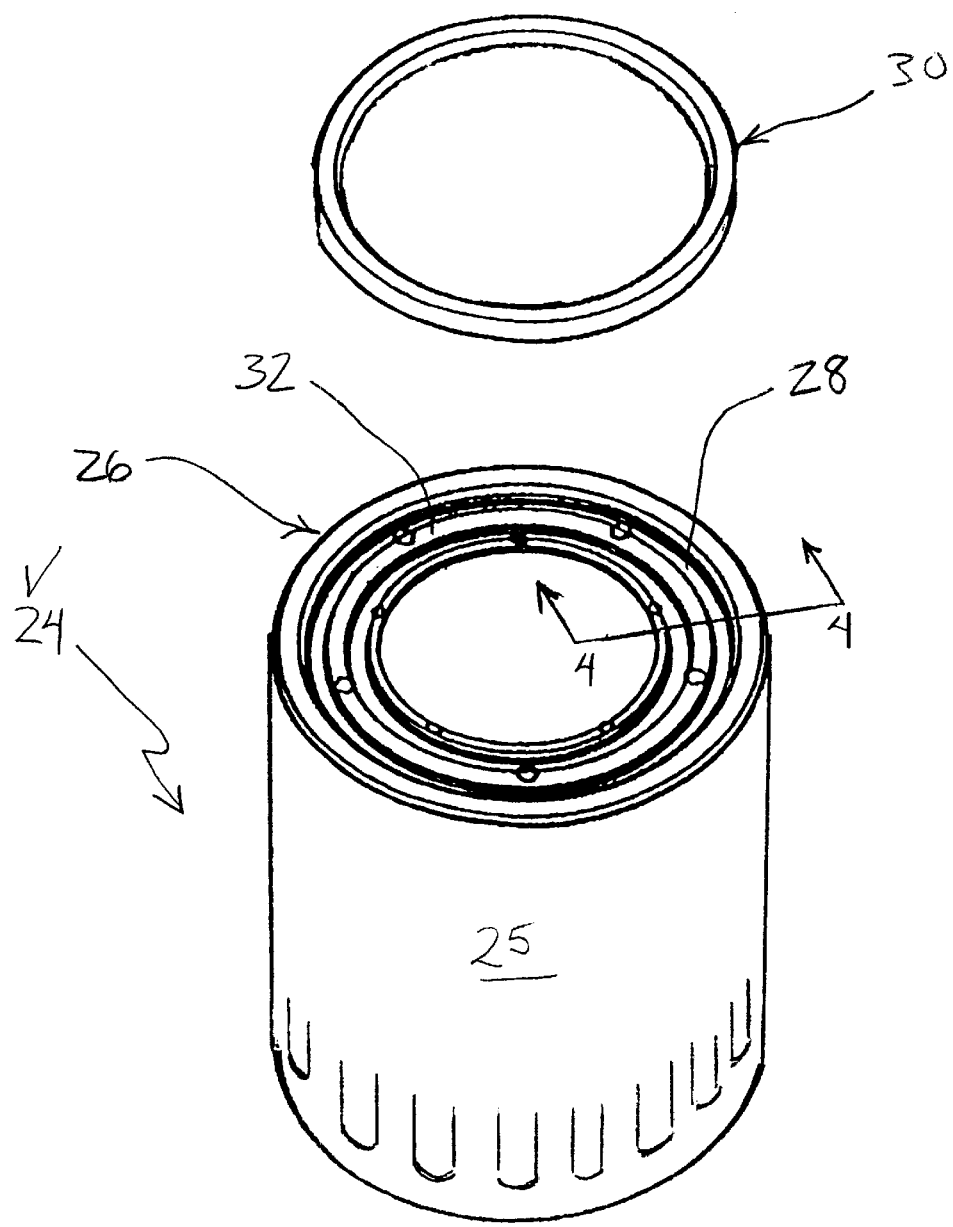
FIG. 3 is an exploded perspective view of an inverted fluid filter housing and a gasket therefor.

Referring now to FIG. 1 of the drawings, a measuring tool, in accordance with a first embodiment of the present invention, is shown generally at 10. In the embodiment of FIG. 1, the measuring tool 10 is constructed from a single piece of stock, preferably metal or a durable, high-strength plastic.

The tool 10 includes a tool body 12, which is formed in a curved wedge shape, for use in measuring spaces or gaps between curved objects, or between a curved workpiece surface and a spaced apart feature, element or second portion of the same object. The tool body 12 is preferred to be substantially C-shaped, as shown, and is formed essentially as a curved wedge, having a calibrated width at each point along the length thereof. The lateral thickness across the tool body varies from a first width, at a first end 14 thereof, to a second width, thinner than the first width, at a second end 16 thereof. The first end 14 may include a rounded-off tip, as shown, which may be somewhat narrower than the widest point of the tool body.

Optionally, but not necessarily, the tool 10 may include a handle 9 connected to the tool body 12 by an intermediate connector bar 11, as shown in phantom in FIG. 2.

Preferably, the tool body 12 has opposed, substantially flattened top and bottom surfaces 18, 20 for selected alignment with a flattened surface of a workpiece. The top and bottom surfaces may be parallel to one another. One or both of the top and bottom surfaces 18, 20 has a series of calibrated ruler-like measurements etched into, or otherwise marked on the surface thereof. The tool body 12 tapers gradually and continuously from the first end 14 to the second end 16, and becomes progressively narrower as it moves away from the widest point thereof, at the first end. The tool body 12 also gradually curves, as it moves from the first end 14 to the second end 16, so that it is substantially C-shaped, as noted. The tool body 12 has indicia 22 on at least one of the surfaces 18, 19, 20, 21, to indicate the thickness thereof, at selected, regularly spaced apart intervals. Preferably, the tool body 12 has indicia 22 on both the top and bottom surfaces 18, 20, respectively. The indicia 22 may include line markings and numbers representing the lateral thickness across the tool body at a given point. These numbers may be according to the metric system, or may be in inches or fractions thereof. Optionally, these markings may extend down the curved side surfaces 19, 21.

The tool body 12 also has curved front and rear surfaces 19, 21 extending between the top and bottom surfaces 18, 20 on opposite sides thereof. One or both of the curved front and rear surfaces 19, 21 may also have marking indicia thereon, as shown in FIG. 2, to represent the lateral width across the tool body at different points thereon.

The curved wedge shape of the tool body 12 allows a user to easily measure multiple gap sizes with a single tool. The curved shape of the tool body 12 allows it to fit slidably into a gap, such as those shown at X, Y (FIG. 5), for efficient and accurate measurement, rather than requiring a more cumbersome operation such as adjusting a caliper, or manipulating a pin gauge. In addition, the tool 10, according to the invention, increases the speed of production through elimination of the time-consuming process of re-calibrating current measuring tools.

Application of the Tool to Measure a Gap

The following discussion illustrates one example of a specific application of the tool 10 hereof to measure a gap adjacent to a curved surface. This example is intended to illustrate, rather than to limit the invention. Those in the art will realize that many other applications of the tool may be found, in addition to the specific example given here.

Referring now to FIG. 3, a spin-on fluid filter housing is shown generally at 24, in an inverted orientation, with the central structure thereof omitted from the drawing for clarity of illustration. The filter 24 includes a base plate 26, which has been stamped, or otherwise machined, to form an annular groove 28 therein. The annular groove 28 is formed in the base plate 26 to retentively receive a conventional rubber gasket 30 therein. The gasket 30 is provided to form a fluid-impermeable seal upon installation of the filter 24 on a support base (not shown).

Figure 4:
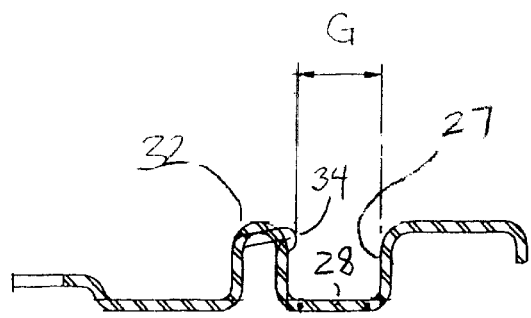
FIG. 4 is a cross-sectional view of a portion of the base plate of the filter housing of FIG. 3, taken along the line 4—4 of FIG. 3.
Figure 5:
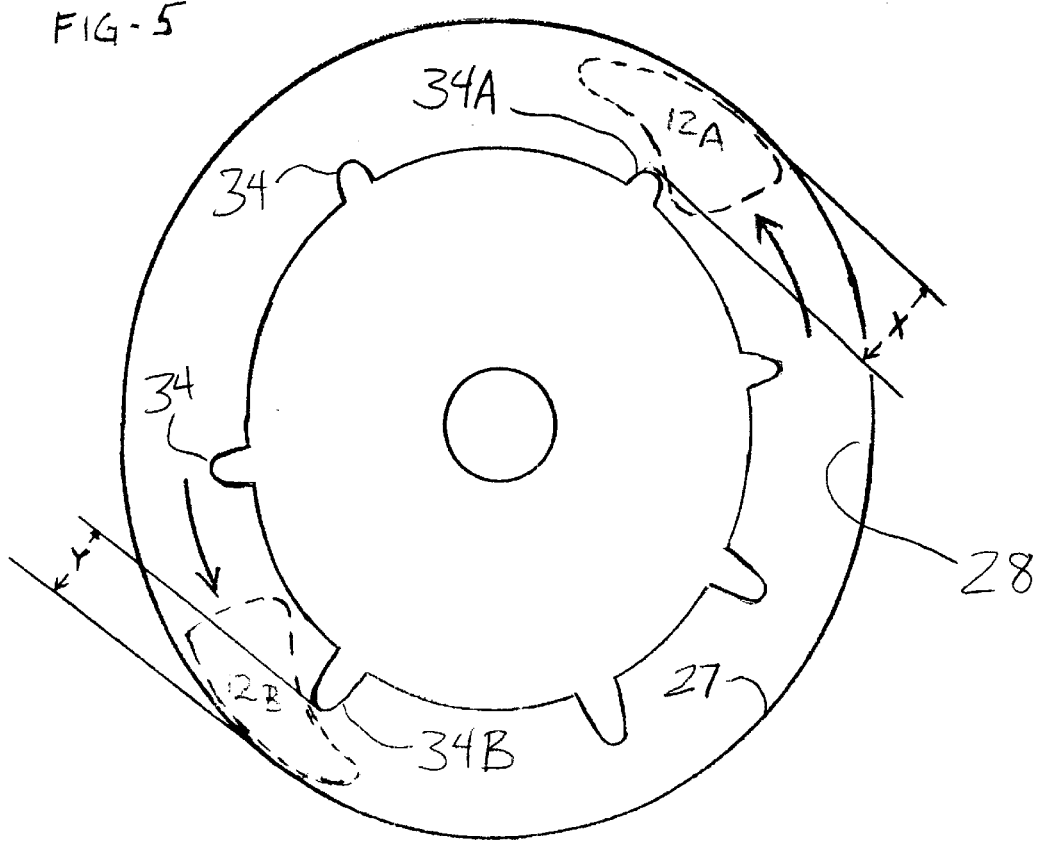
FIG. 5 is a simplified bottom plan view of the fluid filter base plate of FIGS. 3–4, showing two possible placements of the measuring tool superimposed in phantom thereon.

As shown in FIGS. 4 and 5, the base plate 26 also has a ridge 32 formed thereon, adjacent the annular groove 28, and disposed radially inwardly thereof, defining the inner wall of the groove. The ridge 32 is further machined in selected areas, to form outwardly extending retaining bosses 34 thereon.

The retaining bosses 34 extend radially outwardly from the rest of the ridge 32, a small amount, at the top of the groove 28. These retaining bosses 34 are small enough to allow the flexible gasket 30 to be pushed therepast, when some force is applied to the gasket. However, once the gasket 30 is in place in the groove 28, and is pinched by the retaining bosses 34, it will remain in place under normal handling conditions, effectively keeping the gasket and filter housing 25 connected as an assembly. However, if the retaining bosses 34 extend too far into the groove 18 or do not extend far enough into the groove 18, problems may ensue.

In the manufacturing process, it is necessary to measure the gap G (FIG. 4) between the outer wall of the groove 28 and the tip of the retaining boss 34. Some variation is acceptable in the dimension of this gap, but a range of acceptable spacing is established for quality control purposes. If this gap G is too wide, the gasket 30 will not be effectively retained in the groove 28. Conversely, if the gap G is too narrow, excessive force will be required to push the gasket 30 past the bosses 34, or the gasket may be effectively prevented from entry into the groove 28 at that point.

Referring now to FIG. 5, a simplified plan view of the groove 28 is shown with a number of bosses 34 extending into the groove. The size of the bosses 34, and the discrepancies between them, has been exaggerated in the drawing for purposes of illustration.

In order to measure the gap G, the tool body 12, according to the invention, is placed into the groove 28, with the narrow end 16 of the tool between the outer wall 27 and the boss 34, and with the bottom surface 20 of the tool resting against the base plate 26 at the floor of the groove. The tool body 12 is then slidably moved in the groove, in a direction which gradually increases the width of the portion of the tool body 12 disposed between the boss 34 and the outer wall 27. This movement of the tool 10, relative to the filter base plate 26, continues until the tool body stops, and can move no further. At this point, the tool body 12 is touching both the outer wall 27 and the tip of the boss 34, and a reading may be taken of the indicia 22, on the top or side surface of the tool body 12, to measure the width of the gap G at that point.

FIG. 5 illustrates a first orientation 12A of a tool body 12, measuring a first distance X of a sample gap G between a first boss 34A and the outer wall 27, at the top portion of the drawing. Since the first boss 34A is slightly undersized, the first distance X is of a relatively large dimension, and accordingly, the measurement is taken towards the wide end 14 of the tool. FIG. 5 also illustrates a second orientation 12B of a tool body 12, measuring a second distance Y between a second boss 34B and the outer wall 27, at the bottom portion of the drawing. Since the second boss 34B is slightly oversized, the second distance Y is of a relatively small dimension as compared to the first distance X, and as a result, the measurement of the second distance Y is taken towards the narrow end 16 of the tool.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications, which are within the scope of the claims, are intended to be within the scope and spirit of the present invention.

Having, thus, described the invention, what is claimed is:

1. A tool for measuring gaps proximate curved surfaces, said tool comprising:
   a curved tool body, said tool body having a first end, and a second end which is narrower than the first end;
   wherein said tool body tapers gradually and continuously from the first end to the second end, and becomes progressively narrower as it moves away from the first end;
   wherein said tool body also gradually curves, as it moves from the first to the second end;
   and further wherein at least one exterior surface of said tool body has indicia thereon, to indicate the thickness thereof, at selected, regularly spaced apart intervals.

2. The tool of claim 1, wherein the tool body has a substantially C-shaped cross-section.

3. The tool of claim 1, wherein said tool body has a top surface, a substantially flattened bottom surface, and curved front and rear surfaces, and wherein said indicia are located on at least one surface selected from said top, bottom, front and rear surfaces.

4. The tool of claim 3, wherein said indicia are located on both of said top and bottom surfaces of said tool body.

5. The tool of claim 3, wherein said indicia are located on said top surface of said tool body, and said indicia are also located on at least one of said front and back surfaces of said tool body.

6. The tool of claim 3, wherein said top surface is substantially flat, and wherein said top and bottom surfaces are substantially parallel to one another.

7. The tool of claim 1, wherein said first end of said tool body includes a rounded tip portion.

8. The tool of claim 1, further comprising a handle, and an intermediate member interconnecting the handle to the tool body.

9. A tool for measuring gaps proximate curved surfaces, said tool comprising:
   a curved tool body having a substantially C-shaped cross section, said tool body having a first end, and a second end which is narrower than the first end;
   said tool body having substantially flattened top and bottom surfaces which are substantially parallel to one another, and having curved front and rear surfaces;
   wherein said tool body tapers gradually and continuously from the first end to the second end, and becomes progressively narrower as it moves away from the first end;
   wherein said tool body also gradually curves, as it moves from the first end to the second end;
   and further wherein at least one exterior surface of said tool body has indicia thereon, to indicate the thickness thereof, at selected, regularly spaced apart intervals.

10. The tool of claim 9, wherein said indicia are located on both of said top and bottom surfaces of said tool body.

11. The tool of claim 9, wherein said indicia are located on said top surface of said tool body, and said indicia are also located on at least one of said front and rear surfaces of said tool body.

12. The tool of claim 9, wherein said first end of said tool body includes a rounded tip portion.

13. The tool of claim 9, further comprising a handle, and an intermediate member interconnecting the handle to the tool body.

14. A method of measuring a gap proximate a curved surface of a workpiece, comprising the steps of:
   a) aligning a curved surface of a tool body with a curved surface of the workpiece;
   b) sliding a narrow end of said tool body into a gap between said curved surface and a portion of said workpiece which is spaced away from said workpiece curved surface, said tool body progressively widening as it moves away from said narrow end;
   c) slidably moving said tool body through said gap until said tool body simultaneously contacts both said workpiece curved surface and said spaced away portion; and
   d) reading indicia on said tool body corresponding to the width of said tool body in said gap.

* * * * *